(12) United States Patent
Arakawa

(10) Patent No.: US 8,666,831 B2
(45) Date of Patent: Mar. 4, 2014

(54) POWER GENERATION LEVELING SYSTEM AND POWER GENERATION LEVELING METHOD

(75) Inventor: Koji Arakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 287 days.

(21) Appl. No.: 13/085,649

(22) Filed: Apr. 13, 2011

(65) Prior Publication Data

US 2011/0258063 A1  Oct. 20, 2011

(30) Foreign Application Priority Data

Apr. 16, 2010  (JP) ................................. 2010-095037

(51) Int. Cl.
*G06Q 30/00* (2012.01)
(52) U.S. Cl.
USPC ......................................... 705/26.1; 705/412
(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2, 412
See application file for complete search history.

(56) References Cited

U.S. PATENT DOCUMENTS

| | | | | |
|---|---|---|---|---|
| 7,590,472 B2* | 9/2009 | Hakim et al. | ................. | 700/295 |
| 7,752,145 B2* | 7/2010 | Kelty | ............................ | 700/295 |
| 7,792,613 B2* | 9/2010 | Kressner et al. | ............. | 700/296 |
| 7,957,846 B2* | 6/2011 | Hakim et al. | ................. | 700/295 |
| 8,497,660 B2* | 7/2013 | Soong et al. | ................. | 320/109 |
| 2007/0203860 A1* | 8/2007 | Golden et al. | ................ | 705/412 |
| 2009/0062967 A1* | 3/2009 | Kressner et al. | ............. | 700/286 |
| 2009/0094173 A1* | 4/2009 | Smith et al. | .................... | 705/412 |
| 2010/0017043 A1* | 1/2010 | Kressner et al. | ............. | 700/291 |

FOREIGN PATENT DOCUMENTS

| | | |
|---|---|---|
| JP | 2006163576 A | 6/2006 |
| JP | 2007295650 A | 11/2007 |

OTHER PUBLICATIONS

Frank Kreith et al. "The road not yet taken: to end our dependence on rapidly dwindling oil supplies, switching to hybrid vehicles and ethanol fuel from corn simply isn't enough." Mechanical Engineering-CIME, 129, 4, 24(5), Apr. 2007. Retrieved from Dialog File: 148, Acc#: 0022046866.*

* cited by examiner

*Primary Examiner* — Naeem Haq
(74) *Attorney, Agent, or Firm* — Sughrue Mion, PLLC

(57) ABSTRACT

A communication part of a purchased power management device transmits, in response to an instruction from a user, rate information indicating a rate of power that the user wants to purchase to a sales management device. A charging part of the purchased power management device charges the battery at a date and time designated by the sales management device. A power output part of the purchased power management device outputs power stored in the battery during a time period of high electric power demand. A sale destination decision part of the sales management device decides a sale destination of the power generated during a time period of low electric power demand on a basis of the rate indicated by the rate information. A sales date and time information transmission part of the sales management device transmits sales date and time information designating a date and time when power is sold to the sale destination decided by the sale destination decision part.

8 Claims, 3 Drawing Sheets

POWER GENERATION LEVELING SYSTEM AND POWER GENERATION LEVELING METHOD

This application is based upon and claims the benefit of priority from Japanese patent application No. 2010-095037, filed on Apr. 16, 2010, the disclosure of which is incorporated herein in its entirety by reference.

TECHNICAL FIELD

The present invention relates to a power generation leveling system and a power generation leveling method capable of leveling the power generation in accordance with a time period.

BACKGROUND ART

It is known that electric power demand varies with a time period in a day. Electric power companies prepare facilities capable of dealing with a time period of peak electric power demand in order to accommodate the electric power demand during such a time period. Then, during a time period of low electric power demand, the electric power companies stop the operation of such facilities partially to change the power generation in accordance with the electric power demand. However, leveling of the power generation has been demanded to improve the operation efficiency of the facilities.

Patent Document 1 describes a system configured to provide a commodity to a user who charges a battery during a time period of low electric power demand and uses power stored in the battery during a time period of high electric power demand.

Patent Document 2 describes a system providing a resident of an apartment house with a power rate for using power in a battery stored during a time period of low electric power demand, to which a lower power rate is set by an electric power company, during a time period of high electric power demand, along with a rate for using the battery.

SUMMARY OF INVENTION

Technical Problem

In recent years, electric utility deregulation has been promoted, allowing the power rate to be set freely between electric power companies and consumers. Although the systems described in Patent Document 1 and Patent Document 2 try to level the electric power demand on an electric power company on the basis of a difference in power rate for each time period decided by the electric power company beforehand, these systems fail to level the electric power demand on electric power companies while flexibly adapting to and reflecting the power rate set freely with electric power companies and fail to level the power generation.

It is an exemplary object of the present invention to provide a power generation leveling system and a power generation leveling method capable of leveling the power generation in accordance with a time period.

Solution to Problem

A power generation leveling system according to an exemplary aspect of invention utilizes power generated during a time period of low electric power demand. The power generation leveling system includes: a sales management device that decides a sale destination of the power generated during a time period of low electric power demand; and a purchased power management device including a battery storing purchased power. The purchased power management device includes: a communication part that, in response to an instruction from a user, transmits rate information indicating a rate of power that the user wants to purchase to the sales management device; a charging part that charges the battery at a date and time designated by the sales management device; and a power output part that outputs power stored in the battery during a time period of high electric power demand. The sales management device includes: a sale destination decision part that decides a sale destination of the power generated during a time period of low electric power demand on a basis of the rate indicated by the rate information; and a sales date and time information transmission part that transmits sales date and time information designating a date and time when power is sold to the sale destination decided by the sale destination decision part.

A power generation leveling method according to an exemplary aspect of invention is for utilizing power generated during a time period of low electric power demand. The power generation leveling method includes the steps of: transmitting, in response to an instruction from a user, rate information indicating a rate of the power generated during a time period of low electric power demand that the user wants to purchase; deciding a sale destination of the power generated during a time period of low electric power demand on a basis of the rate indicated by the rate information; transmitting sales date and time information designating a date and time when power is to be sold to the decided sale destination; charging a battery at the date and time designated by the sales date and time information; and outputting the power stored in the battery during a time period of high electric power demand.

Advantageous Effects of the Invention

According to the present invention, power generated during a time period of low electric power demand is utilized, so as to enable electric power demand on electric power companies to be leveled, and accordingly enable the power generation to be leveled.

DESCRIPTION OF EMBODIMENTS

Figure 1:
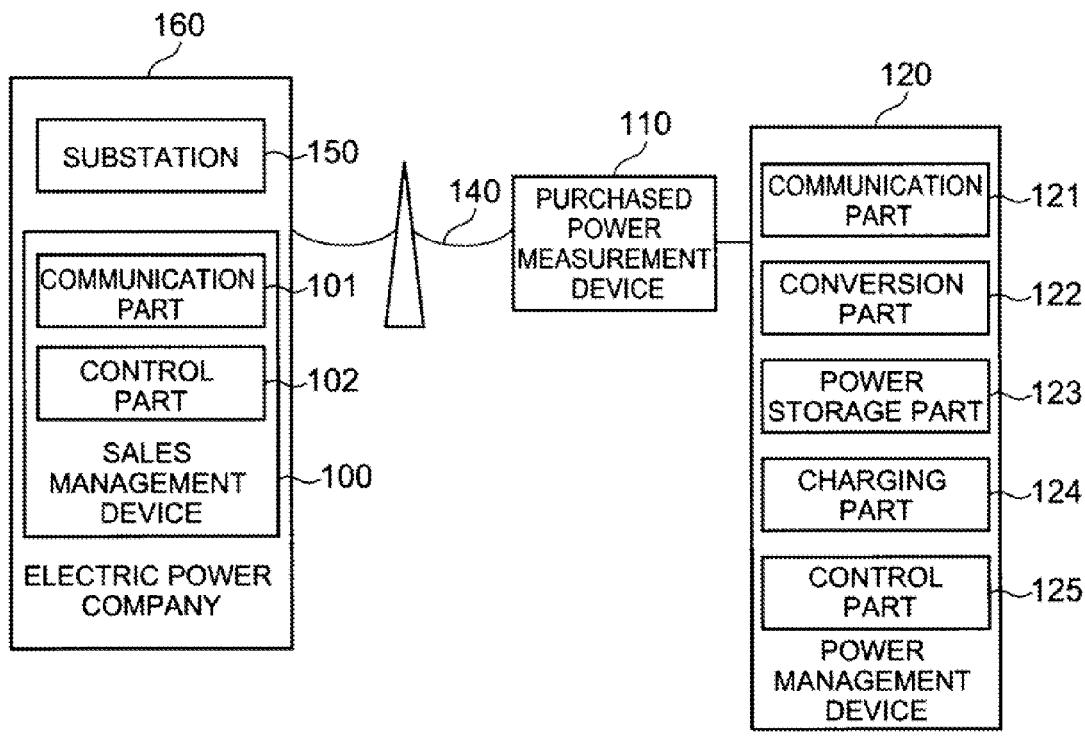
FIG. 1 describes the configuration of an exemplary embodiment of a power generation leveling system according to the present invention.

The following describes exemplary embodiments of a power generation leveling system according to the present invention, with reference to the drawings. FIG. 1 describes the configuration of an exemplary embodiment of a power generation leveling system according to the present invention.

As illustrated in FIG. 1, the power generation leveling system according to the present invention includes a sales management device 100, a purchased power measurement device 110 and a power management device 120. The purchased power measurement device 110 is connected with the sales management device 100 and a substation 150, which are installed by an electric power company 160, via a power line 140. The power management device 120 is connected with the purchased power measurement device 110 via an electric cable for domestic wiring. The sales management device 100 may be operated by an Internet service provider.

The power management device 120 stores power therein, the power being output from the substation 150 via the power line 140 and the purchased power measurement device 110. The power management device 120 further exchanges information with the sales management device 100 by PLC (Power Line Communication) via the power line 140 and the purchased power measurement device 110.

As illustrated in FIG. 1, the power management device 120 includes a communication part 121, a conversion part 122, a power storage part 123, a charging part 124, and a control part 125.

In accordance with an instruction from a user, the communication part 121 transmits bid information indicating a power rate and electric energy that the user wants to purchase to the sales management device 100 by PLC via the power line 140. The communication part 121 receives sales electric energy information indicating the electric energy to be sold and sales date and time information indicating the date and time when the power is sold, which are transmitted by the sales management device 100 by PLC via the power line 140.

The power storage part 123 stores power therein. The conversion part 122 converts AC power output from the substation 150 via the power line 140 into DC power in accordance with an instruction from the control part 125. The conversion part 122 further converts DC power stored in the power storage part 123 into AC power. At the date and time indicated by the sales date and time information received by the communication part 121, the control part 125 instructs the conversion part 122 to start the conversion of AC power into DC power, and instructs the charging part 124 to start charging of power. In accordance with the instruction from the control part 125, the charging part 124 charges the power storage part 123 with DC power converted from AC power by the conversion part 122.

The conversion part 122 of the power management device 120 includes a switch shifting between an open state and a close state in accordance with an instruction from the control part 125, for example, and when the switch is in a close state, current based on power output from the substation 150 is input to the conversion part 122 for conversion of AC power into DC power, and the DC power is input to the charging part 124. At the date and time indicated by the sales date and time information, the communication part 121 notifies the purchased power measurement device 110 of the starting of charging of the power storage part 123 and the electric energy indicated by the sales electric energy information.

The purchased power measurement device 110 measures the electric energy stored in the power storage part 123 of the power management device 120. More specifically, when a notice is given from the communication part 121 of the power management device 120 about the starting of charging of the power storage part 123, the purchased power measurement device 110 starts the measurement of the electric energy on the basis of a value of current flowing into the power management device 120 through the purchased power measurement device 110 itself. When the measured electric energy reaches the electric energy indicated by the sales electric energy information notified from the communication part 121 of the power management device 120, the purchased power measurement device 110 notifies the power management device 120 that it is the timing when the charging is to be finished. Then, the purchased power measurement device 110 transmits purchased electric energy information indicating the electric energy as a result of the measurement to the sales management device 100 by PLC via the power line 140.

As illustrated in FIG. 1, the sales management device 100 includes a communication part 101 and a control part 102. The communication part 101 transmits public information indicating electric energy to be sold and a date and time when sale of the power is started in response to a request from a communication terminal connected with the Internet, and receives bid information transmitted by the power management device 120. The control part 102 decides a sale destination on the basis of the rate and the electric energy indicated by the bid information received by the communication part 101. The control part 102 further calculates the amount billed to the installer of the power management device 120 on the basis of the electric energy indicated by the purchased electric energy information that the communication part 101 receives from the purchased power measurement device 110 and the rate indicated by the bid information.

Figure 2:
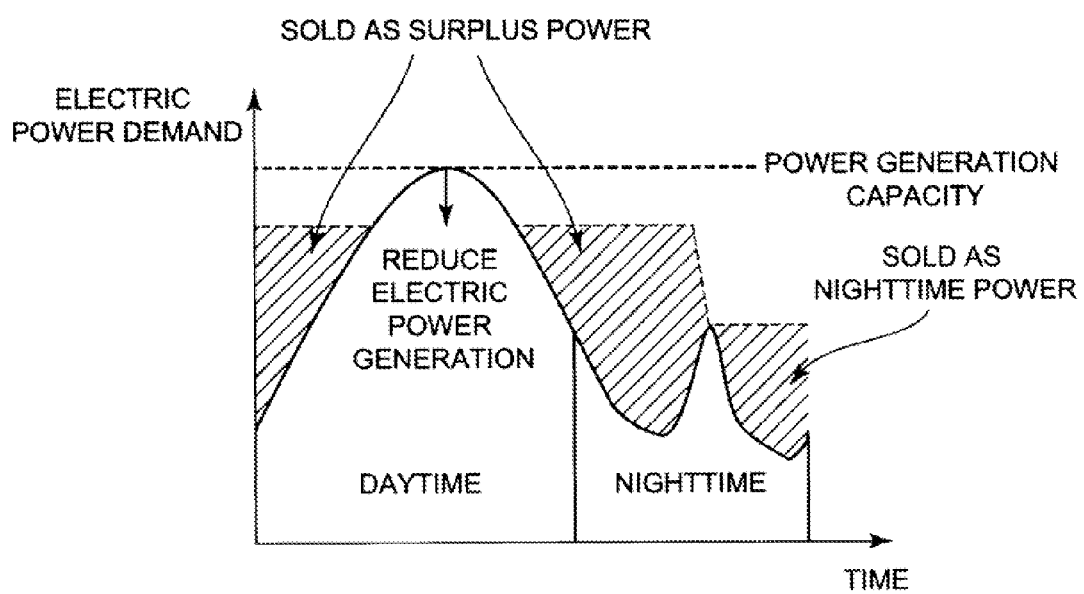
FIG. 2 describes the power sold by a power generation leveling system according to the present invention.

FIG. 2 describes the power sold by the power generation leveling system according to the present invention. As illustrated in FIG. 2, electric power demand varies with a time period in a day. The electric power company 160 prepares facilities to deal with a time period of peak electric power demand. The power generation leveling system according to the present invention enables facilities prepared by the electric power company 160 for dealing with a time period of peak electric power demand to be utilized during a time period of low electric power demand, and enables power generated by the facilities during a time period of low electric power demand to be sold as surplus power, so as to utilize the surplus power during a time period of high electric power demand. Thusly, electric power demand on the electric power company is reduced during a time period of peak electric power demand, thus reducing the power generation during such a time period for leveling of the power generation. Herein, a time period of low electric power demand refers to a time period of electric power demand less than the time period of peak electric power demand by a predetermined ratio (e.g., 10% or 20%).

Figure 3:
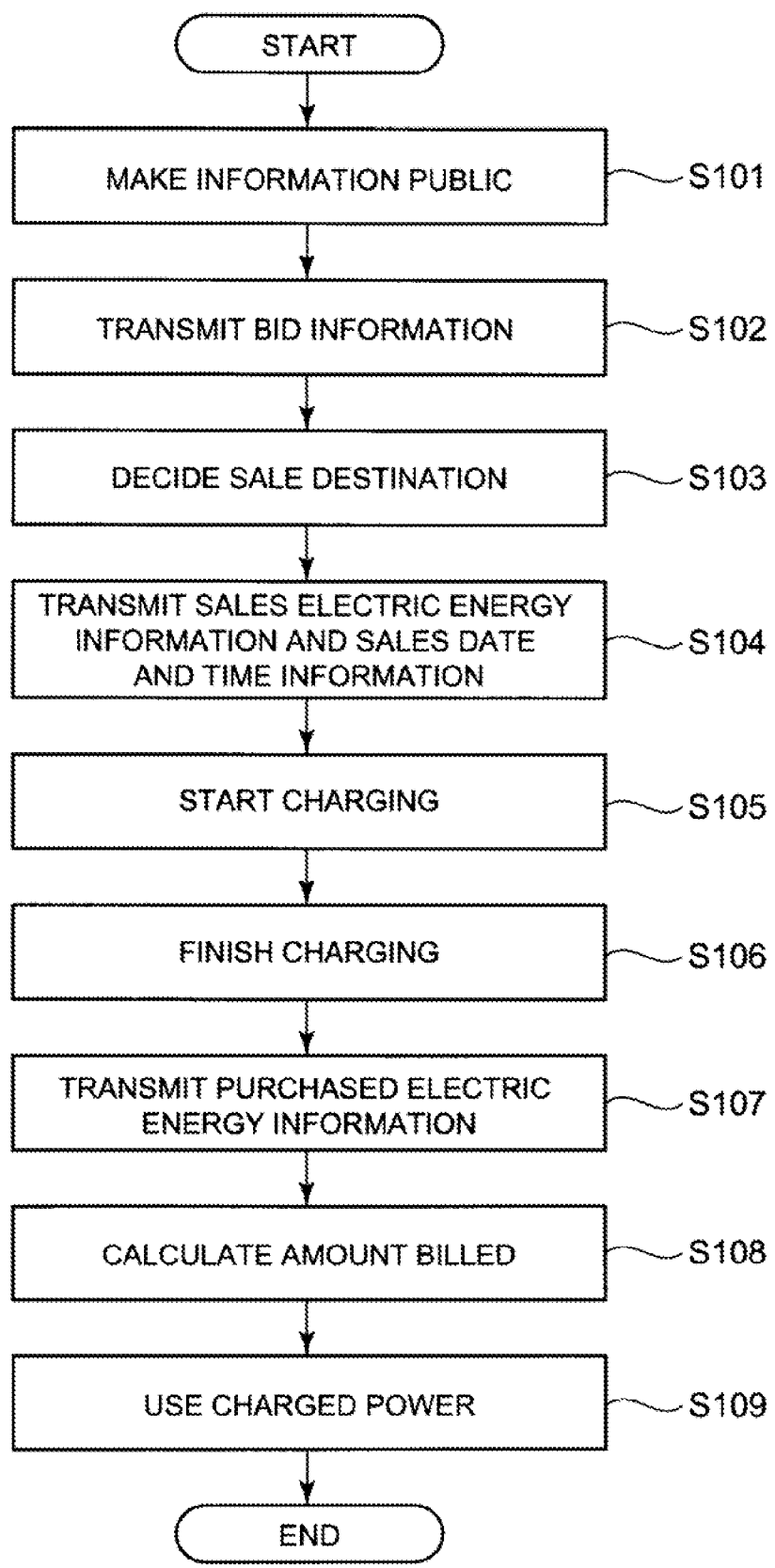
FIG. 3 is a flowchart showing the operation of a power generation leveling system according to the present invention.

Next, the operation of the power generation leveling system illustrated in FIG. 1 is described below, with reference to the drawing. FIG. 3 is a flowchart showing the operation of the power generation leveling system illustrated in FIG. 1.

In accordance with an instruction from an administrator, the communication part 101 of the sales management device 100 transmits public information indicating electric energy to be sold during a time period of low electric power demand and a scheduled date and time when supply of the power to be sold is started in response to a request from a communication terminal connected with the Internet. In other words, the electric energy to be sold and the scheduled date and time when supply of the power to be sold is started are open to the public via the Internet (Step S101).

In response to an instruction from a user, the communication part 121 of the power management device 120 transmits bid information to the sales management device 100 by PLC via the power line 140 (Step S102). The communication part 101 of the sales management device 100 receives the bid information transmitted by the communication part 121 of the power management device 120 via the power line 140.

On the basis of the rate indicated by the bid information that the communication part 101 receives, the control part 102 of the sales management device 100 decides a sale destination (Step S103). More specifically, the control part 102 of the sales management device 100 decides a sender of the bid information indicating the lowest rate as the sale destination, for example. Then, the communication part 101 transmits sales electric energy information and sales date and time information to the power management device 120 decided as the sale destination by PLC via the power line 140 (Step S104). The communication part 121 of the power management device 120 decided as the sale destination receives the sales electric energy information and the sales date and time information transmitted by the communication part 101 of the sales management device 100 via the power line 140.

At the date and time indicated by the sales date and time information received by the communication part 121, the control part 125 of the power management device 120 instructs the conversion part 122 to convert AC power into DC power and instructs the charging part 124 to start charging. In response to the instruction from the control part 125, the charging part 124 starts charging of the power storage part 123 with DC power converted from AC power by the conversion part 122 (Step S105), and notifies the purchased power measurement device 110 of the starting of charging of the power storage part 123 and the electric energy indicated by the sales electric energy information. The purchased power measurement device 110 starts the measurement of electric energy.

When the measured electric energy reaches the notified electric energy, the purchased power measurement device 110 notifies the power management device 120 that it is the timing when the charging is to be finished. When being notified from the purchased power measurement device 110 of the timing when the charging is to be finished, the control part 125 of the power management device 120 instructs the charging part 124 to stop the charging. The charging part 124 stops the charging in accordance with the instruction from the control part 125 (Step S106). Then, the purchased power measurement device 110 finishes the measurement of the electric energy, and transmits purchased electric energy information indicating the electric energy as a result of the measurement to the sales management device 100 by PLC via the power line 140 (Step S107).

The communication part 101 of the sales management device 100 receives the purchased electric energy information transmitted by the purchased power measurement device 110. The control part 102 calculates the amount billed by multiplying the electric energy indicated by the purchased electric energy information that the communication part 101 receives by the rate indicated by the bid information transmitted in the processing at Step S102 (Step S108).

When the power storage part 123 has been charged with power and it is a time period of high electric power demand set by a user beforehand, the control part 125 of the power management device 120 instructs the conversion part 122 to convert DC power stored in the power storage part 123 into AC power. The conversion part 122 converts DC power stored in the power storage part 123 into AC power, and outputs the AC power to a device connected with the power management device 120.

In the present embodiment, power generated during a time period of low electric power demand is utilized to level the electric power demand on an electric power company for leveling of the power generation. More specifically, electric power demand on an electric power company is reduced during a time period of high electric power demand, whereby the power generation can be leveled. Further, facilities prepared for dealing with a time period of peak electric power demand are utilized during a time period of low electric power demand, whereby operation efficiency of the facilities in the electric power company can be improved.

As electric utility deregulation moves forward, a sale destination of power is decided on the basis of a bidden rate. That is, the rate of power to be sold is decided through bidding. Accordingly, the rate of power is decided on the basis of a change in quantity of the electric power demanded and on the basis of a change in the electric energy that can be supplied. As a result, active purchase and sale of power that is generated during a time period of low electric power demand is expected, and such power can be used during a time period of high electric power demand so as to level the electric power demand on electric power companies, and accordingly to level the power generation.

Note here that the power management device 120 may supply power to other devices during a time period of high electric power demand, or may use power by its own device. More specifically, each of the devices in a data center provided with a plurality of routers and servers may include the elements included in the power management device 120 illustrated in FIG. 1, and each device may perform charging during a time period of low electric power demand, and use the charged power during a time period of high electric power demand. Alternatively, one device may include the elements included in the power management device 120 illustrated in FIG. 1, so as to perform charging during a time period of low electric power demand, and supply the charged power to another device during a time period of high electric power demand.

DC power stored in the power storage part 123 may be supplied to another device or may be used by its own device without converting it into AC power. Such a configuration can be free from loss generated during conversion from DC power into AC power.

Figure 4:
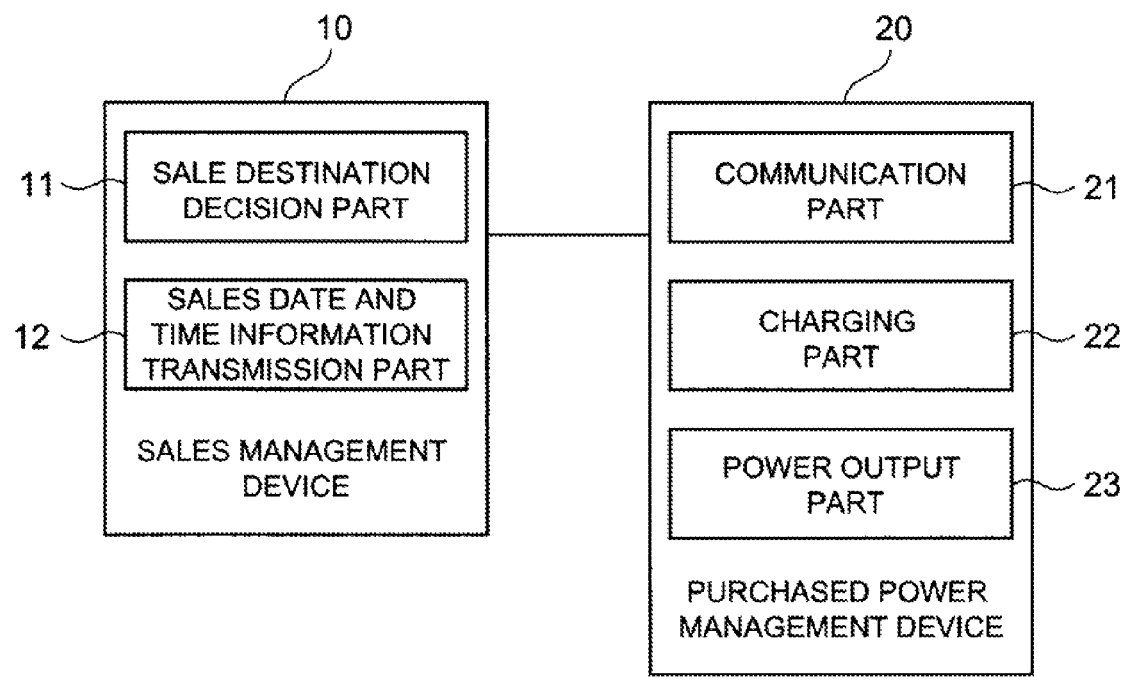
FIG. 4 is a block diagram schematically showing the present invention.

The following describes the present invention in outline. FIG. 4 is a block diagram schematically illustrating the present invention. As illustrated in FIG. 4, the power generation leveling system according to the present invention includes a sales management device 10 (corresponding to the sales management device 100 illustrated in FIG. 1) and a purchased power management device 20 (corresponding to the power management device 120 illustrated in FIG. 1). The sales management device 10 decides a sale destination of power that is generated during a time period of low electric power demand. The purchased power management device 20 includes a battery (corresponding to the power storage part 123 illustrated in FIG. 1) storing the purchased power therein.

The sales management device 10 includes a sale destination decision part 11 (corresponding to the control part 102 illustrated in FIG. 1) and a sales date and time information transmission part 12 (corresponding to the communication part 101 illustrated in FIG. 1). The purchased power management device 20 includes a communication part 21 (corresponding to the communication part 121 illustrated in FIG. 1), a charging part 22 (corresponding to the charging part 124 illustrated in FIG. 1), and a power output part 23 (corresponding to the conversion part 122 and the control part 125 illustrated in FIG. 1).

In response to an instruction from a user, the communication part 21 transmits, to the sales management device 10, rate information indicating a rate of power that the user wants to purchase. The charging part 22 charges the battery at a date and time designated by the sales management device 10. The power output part 23 outputs power stored in the battery during a time period of high electric power demand. The sale destination decision part 11 decides a sale destination of power generated during a time period of low electric power demand on the basis of the rate indicated by the rate information. The sales date and time information transmission part 12 transmits sales date and time information designating a date and time when power is to be sold to the sale destination decided by the sale destination decision part 11.

According to such a configuration, power generated during a time period of low electric power demand can be used during a time period of high electric power demand, so as to enable the electric power demand on electric power companies varying with a time period to be leveled, and accordingly enable the power generation to be leveled.

The above-stated exemplary embodiment discloses the following power generation leveling systems as in (1) to (4) as well.

(1) In the power generation leveling system, the sales management device 10 includes a public information part (corresponding to the communication part 101 illustrated in FIG. 1) that transmits supply date and time information indicating scheduled date and time when power to be sold is supplied in response to a request from a communication terminal connected with the Internet, and the communication part 21 of the purchased power management device 20 transmits rate information to the sales management device 10 in accordance with a user's operation on the basis of the scheduled date and time indicated by the supply date and time information transmitted by the public information part of the sales management device 10. With this configuration, bid is solicited by making information open to the public, the information indicating timing when power to be sold is supplied, whereby power generated during a time period of low electric power demand can be sold more to increase the income of an electric power company.

(2) The power generation leveling system includes an electric energy measurement part (corresponding to the purchased power measurement device 110 illustrated in FIG. 1) that measures electric energy stored in the battery by the charging part 22 of the purchased power management device 20 and an information transmission part (corresponding to the purchased power measurement device 110 illustrated in FIG. 1) that transmits purchased electric energy information indicating a result of the measurement by the electric energy measurement part to the sales management device 10. The sales management device 10 includes a rate calculation part (corresponding to the control part 102 illustrated in FIG. 1) that calculates an amount billed to an installer of the purchased power management device 20 on the basis of the electric energy indicated by the purchased electric energy information transmitted by the information transmission part 50 and the rate indicated by the rate information transmitted by the communication part 21 of the purchased power management device 20. With this configuration, the amount billed to an installer of the purchased power management device 20 can be easily calculated.

(3) In the power generation leveling system, the information transmission part transmits purchased electric energy information to the sales management device by PLC. With this configuration, information can be exchanged using a power line.

(4) In the power generation leveling system, when power has been stored in the battery, the power output part 23 of the purchased power management device 20 starts output of power stored in the battery during a time period of high electric power demand set by a user beforehand. With this configuration, power generated during a time period of low electric power demand can be used during a time period of high electric power demand in accordance with the setting by a user, thus leveling electric power demand on electric power companies.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Industrial Applicability

The present invention is applicable to a system for leveling electric power demand.

CITATION LIST

Patent Literature

Patent Document 1 Japanese Patent Application Publication No. 2006-163576
Patent Document 2 Japanese Patent Application Publication No. 2007-295650

The invention claimed is:
1. A power generation leveling system that utilizes power generated during a time period of low electric power demand, comprising:
a sales management device that decides a sale destination of the power generated during a time period of low electric power demand;
a purchased power management device including a battery storing purchased power;
an electric energy measurement part that measures electric energy stored in the battery by the charging part of the purchased power management device; and
an information transmission part that transmits purchased electric energy information indicating a result of the measurement by the electric energy measurement part to the sales management device, wherein
the purchased power management device includes
a communication part that, in response to an instruction from a user, transmits rate information indicating a rate of power that the user wants to purchase to the sales management device;
a charging part that charges the battery at a date and time designated by the sales management device; and
a power output part that outputs power stored in the battery during a time period of high electric power demand, wherein
the sales management device includes
a sale destination decision part that decides a sale destination of the power generated during a time period of low electric power demand on a basis of the rate indicated by the rate information;
a sales date and time information transmission part that transmits sales date and time information designating a date and time when power is sold to the sale destination decided b the sale destination decision part; and
a rate calculation part that calculates an amount billed to an installer of the purchased power management device on a basis of electric energy indicated by the purchased electric energy information transmitted by the information transmission part and the rate indicated by the rate information transmitted by the communication part of the purchased power management device.

2. The power generation leveling system according to claim 1, wherein the information transmission part transmits the purchased electric energy information to the sales management device by PLC.

3. The power generation leveling system according to claim 2, wherein when power has been stored in the battery, the power output part of the purchased power management device starts output of power stored in the battery during a time period of high electric power demand set by a user beforehand.

4. The power generation leveling system according to claim 1, wherein when power has been stored in the battery, the power output part of the purchased power management device starts output of power stored in the battery during a time period of high electric power demand set by a user beforehand.

5. A power generation leveling system that utilizes power generated during a time period of low electric power demand, comprising:
- a sales management device that decides a sale destination of the power generated during a time period of low electric power demand;
- a purchased power management device including a battery storing purchased power;
- an electric energy measurement part that measures electric energy stored in the battery by the charging part of the purchased power management device; and
- an information transmission part that transmits purchased electric energy information indicating a result of the measurement by the electric energy measurement part to the sales management device, wherein the purchased power management device includes
- a communication part that, in response to an instruction from a user, transmits rate information indicating a rate of power that the user wants to purchase to the sales management device;
- a charging part that charges the battery at a date and time designated by the sales management device; and
- a power output part that outputs power stored in the battery during a time period of high electric power demand, wherein the sales management device includes
- a sale destination decision part that decides a sale destination of the power generated during a time period of low electric power demand on a basis of the rate indicated by the rate information;
- a sales date and time information transmission part that transmits sales date and time information designating a date and time when s power is sold to the sale destination decided b the sale destination decision part;
- a public information part that transmits supply date and time information indicating scheduled date and time when power to be sold is supplied in response to a request from a communication terminal connected with the Internet; and
- a rate calculation part that calculates an amount billed to an installer of the purchased power management device on a basis of electric energy indicated by the purchased electric energy information transmitted by the information transmission part and the rate indicated by the rate information transmitted by the communication part of the purchased power management device, wherein the communication s art of the s purchased power management device transmits the rate information to the sales management device in accordance with a user's operation on a basis of the scheduled date and time indicated by the supply date and time information transmitted by the public information s art of the sales management device.

6. The power generation leveling system according to claim 5, wherein the information transmission part transmits the purchased electric energy information to the sales management device by PLC.

7. The power generation leveling system according to claim 6, wherein when power has been stored in the battery, the power output part of the purchased power management device starts output of power stored in the battery during a time period of high electric power demand set by a user beforehand.

8. The power generation leveling system according to claim 5, wherein when power has been stored in the battery, the power output part of the purchased power management device starts output of power stored in the battery during a time period of high electric power demand set by a user beforehand.

* * * * *